United States Patent

[11] 3,602,048

[72] Inventors Eiji Murata;
　Kohuku Ito, both of Tokyo, Japan
[21] Appl. No. 843,081
[22] Filed July 18, 1969
[45] Patented Aug. 31, 1971
[73] Assignee Honeywell Inc.
　Minneapolis, Minn.
[32] Priority July 19, 1968
[33] Japan
[31] 43/61898

[54] FLUID RECEIVING PORTION OF A HOUSING OF A PRESSURE GAUGE
1 Claim, 2 Drawing Figs.
[52] U.S. Cl. .................................................. 73/420, 73/406
[51] Int. Cl. ................................................... G01l 7/00
[50] Field of Search ....................................... 73/388, 406, 420, 395, 272, 273; 92/171

[56] References Cited
UNITED STATES PATENTS
| | | | |
|---|---|---|---|
| 2,877,799 | 3/1959 | Hildenbrandt, Jr. ........... | 73/395 X |
| 3,228,243 | 1/1966 | Woolf ........................... | 73/272 X |

*Primary Examiner*—Donald O. Woodiel
*Attorneys*—Arthur H. Swanson and Lockwood D. Burton ABSTRACT: A unique cover for a fluid pressure chamber having (1) a member that is subject to corrosion, (2) a corrosive resistant metal sheet in contact with a surface of the member that forms an inner wall of the chamber, (3) a corrosive resistant metal tube that forms a passageway extending through the member and the corrosive resistant sheet into the chamber and, (4) tapered stepped portions on the inner end of the tube for physically engaging the sheet to provide a noncorrosive fluidtight joint between the corrosive resistant metal sheet and tube.

PATENTED AUG 31 1971

3,602,048

INVENTORS.
EIJI MURATA
KOHUKU ITO
BY
Lockwood O. Barton
ATTORNEY

3,602,048

FLUID RECEIVING PORTION OF A HOUSING OF A PRESSURE GAUGE

BACKGROUND OF THE INVENTION

This invention relates to a protection mechanism of pressure housing of a pressure gauge.

In a known diaphragm-type pressure gauge, the cover of a pressure housing is forged as an integral part of other portions of the gauge. If such cover is made by highly corrosion-resisting metal, such as monel metal or tantalum, it becomes too expensive. For this reason, it has not been feasible to manufacture the aforementioned cover by forging corrosion-resisting metal. The diaphragm-type pressure gauge has therefore seldom been used as a liquid level indicator of corrosive liquid.

SUMMARY OF THE INVENTION

The present invention relates to the cover of a diaphragm-type pressure gauge, which is made by forging commonly used metal and then provided a very small quantity of corrosion resisting metal on the inner surface of the cover which comes in contact with corrosive liquid. The cover according to the present invention has a mechanical strength sufficiently high for application to pressure gauge, and yet can be manufactured at a low cost by drastically reducing the amount of corrosion-resisting metal to be used therein, while retaining high corrosion resistivity of the gauge as a whole.

DESCRIPTION OF THE PREFERRED EMBODIMENT

Figure 1:
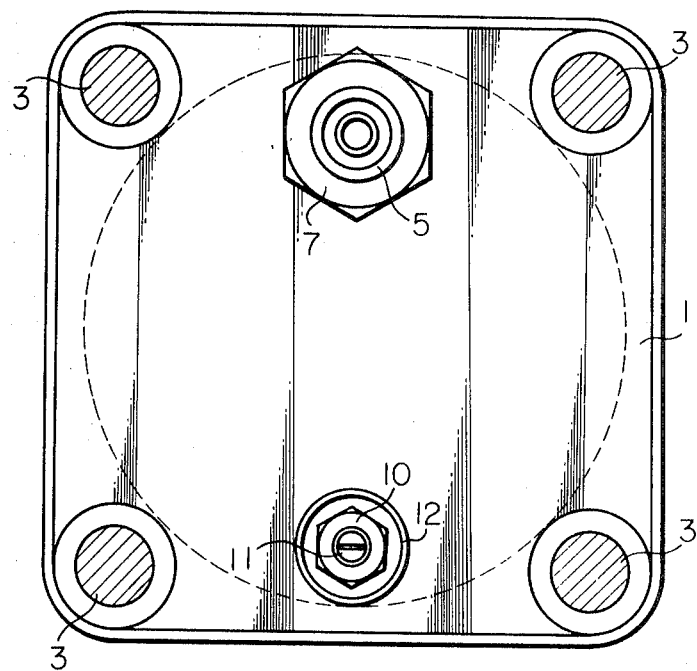
FIG. 1 is a front view of an embodiment of the device provided according to the present invention.

The invention will now be described in detail referring to the accompanying drawings. A cover 1 of pressure gauge housing is mounted on a body 2 of the pressure gauge by bolts 3, with a corrosion-resisting diaphragm 4 being inserted therebetween. A corrosion-resisting metal sheet A, made of monel metal, tantalum, or the like, is lined on the inner surface of cover 1, and the periphery of the sheet A is held between body 2 and the cover 1, while the inner portion of the sheet A is held between the tapered stepped portions $a$ of tubes 5 and 8 that are also made of corrosion-resisting metal.

Figure 2:
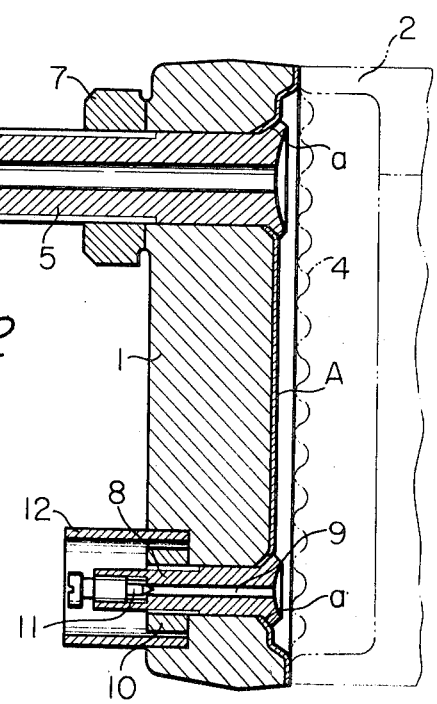
FIG. 2 is a sectional view of the device shown in FIG. 1.

FIG. 2 shows that tubes 5 and 8 secured to the cover 1 by nuts 7 and 10 that threadedly engage these tubes. Tube 5 has a passage 6, through which pressure liquid is fed to the gauge. Tube 8 has a passage 9 bored therethrough. A vent valve 11 is provided against the outlet of passage 9 and is used to remove air in the pressure gauge at the beginning of the operation. A cylindrical protector 12 is mounted on cover 1 to protect vent valve 11.

In operation, liquid to be gauged is fed to the pressure gauge through tube 5, while discharging the air retained previously in the pressure gauge by opening vent valve 11. When vent valve 11 is closed, diaphragm 4 is deflected in response to the liquid pressure to be gauged. The liquid pressure can be determined by measuring the displacement of diaphragm 4 caused by the aforesaid deflection, as in the case of known pressure gauge of similar construction.

As described in the foregoing, according to the present invention, the peripheral edge of a corrosion-resisting metal sheet A, which is lined on the inner surface of a cover 1, is held between cover 1 and a body 2. At the same time, the inner portion of the corrosion-resisting sheet A is held between stepped portions $a$ of corrosion-resisting metal tubes 5 and 8 and cover 1, which tubes are fastened to the cover by nuts 7 and 10 that are shown threadedly engaged with tubes 5 and 8. Thereby, the amount of expensive corrosion-resisting metal in the pressure gauge cover is drastically reduced and the manufacturing cost is greatly reduced, while retaining the excellent corrosion resistivity and mechanical strength. Thus, the present invention succeeded, for the first time in the art, in providing a diaphragm-type pressure gauge which can be used as a liquid level indicator of corrosive liquid.

What is claimed is:

1. A cover for a fluid pressure chamber, comprising a member that is of a material that is subject to corrosion, a sheet of corrosive resistant metal covering a surface of said member that forms an inner wall of said chamber to protect the inner wall of said member from the corrosive action of a corrosive fluid, said member having at least one corrosive resistant metal tube forming a corrosive resistant passageway therein that extends between an outer wall surface of said member through said member and through a wall forming an aperture in said corrosive resistant sheet and then into contact with said sheet by means of tapered stepped portions on the inner end of the tube to thereby provide a noncorrosive fluid-tight joint between the corrosive resistant metal sheet and tube.